(12) United States Patent
Lin

(10) Patent No.: US 8,528,869 B2
(45) Date of Patent: Sep. 10, 2013

(54) RETRACTABLE POST WITH ALARM DEVICE

(75) Inventor: Chien-Ting Lin, Santa Fe Springs, CA (US)

(73) Assignee: Linco Inc., Santa Fe Springs, CA (US)

( * ) Notice: Subject to any disclaimer, the term of this patent is extended or adjusted under 35 U.S.C. 154(b) by 183 days.

(21) Appl. No.: 13/280,325

(22) Filed: Oct. 24, 2011

(65) Prior Publication Data

US 2012/0097090 A1     Apr. 26, 2012

(30) Foreign Application Priority Data

Oct. 25, 2010  (CN) ...................... 2010 2 0574304 U

(51) Int. Cl.
  *F16M 13/00*  (2006.01)

(52) U.S. Cl.
  USPC ..................... 248/158; 248/125.8; 248/200.1; 248/357; 340/546

(58) Field of Classification Search
  USPC .................. 248/158, 125.8, 200.1, 357, 261, 248/251; 446/402; 340/546
  See application file for complete search history.

(56) References Cited

U.S. PATENT DOCUMENTS

| | | | | |
|---|---|---|---|---|
| 2,593,026 A | * | 4/1952 | Hawkins | 135/66 |
| 4,442,427 A | * | 4/1984 | Morton | 340/546 |
| 4,896,139 A | * | 1/1990 | Eldridge | 340/546 |
| 5,041,951 A | * | 8/1991 | Fan | 362/102 |
| 6,943,686 B2 | * | 9/2005 | Allen | 340/546 |
| 2012/0025040 A1 | * | 2/2012 | Lin | 248/188.8 |

* cited by examiner

*Primary Examiner* — Anita M King

(57) ABSTRACT

A retractable post with an alarm device includes a plurality of retractable pipes retractably sleeved with each other. A retractable air whistle is secured by a latch block at a proper location inside the retractable pipe. A plug piece is installed at a bottom of the retractable post. The plug piece and the latch block make an interior of the retractable pipe present a dummy seal state, wherein the retractable pipe is almost but not completely sealed. When an abnormal rapid falling displacement of the retractable pipes occurs, the latch block and the retractable air whistle compress the air inside the retractable pipe, and then a bellow of the retractable air whistle is further compressed, such that the air inside the bellow is rapidly discharged through a sounding valve disposed at a front end of the air whistle, thereby generating an alarm sound.

4 Claims, 5 Drawing Sheets

RETRACTABLE POST WITH ALARM DEVICE

BACKGROUND OF THE INVENTION

1. Field of the Invention

The present invention relates to a retractable post with an alarm device, which is able to generate an alarm sound when the retractable post is abnormally fallen and retracted.

2. The Prior Arts

In photographing, radio and television, movie making, and live broadcast industries, many photographing, image capturing, and illuminating apparatuses are required. These apparatuses need professional stands during use. Since these apparatuses all have considerable weight, a moveable post of a retractable post may be loosened and falling down relative to a stationary post of the retractable post due to the weight, or other factors. If the retractable post is combined with an alarm device for informing personnel nearby, these sudden events can be immediately and properly handled, for example, making adjustment of the relative position between the moveable post and the stationary post, or checking whether or not the retractable post is damaged.

In view that the conventional retractable post is not able to raise an alarm at the time of an abnormal situation, e.g. sudden fall of the moveable post relative to the stationary post of the conventional retractable post, it is desired to provide a retractable post with an alarm device, thereby immediately informing personnel nearby to handle this sudden event.

SUMMARY OF THE INVENTION

A primary objective of the present invention is to provide a retractable post with an alarm device.

In order to solve the above-mentioned problems, a retractable post with an alarm device according to the present invention includes a plurality of retractable pipes retractably sleeved with each other. A retractable air whistle is secured by a latch block at a proper location inside the retractable pipe. A plug piece is installed at a bottom of the retractable post. The plug piece and the latch block make an interior of the retractable pipe present a dummy seal state, which means the retractable pipe is almost but not completely sealed. When an abnormal rapid falling displacement of the retractable pipes occurs, the latch block and the retractable air whistle compress the air inside the retractable pipe, and then a bellow of the retractable air whistle is further compressed, such that the air inside the bellow is rapidly discharged through a sounding valve disposed at a front end of the air whistle, thereby generating a sound and achieving an alarm effect With the technical solution provided by the present invention, when an abnormal situation occurs, e.g. sudden fall of the retractable pipes of the retractable post, an alarm can be raised to inform personnel nearby to handle the sudden event, so as to avoid causing further problems.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the present invention, and are incorporated in and constitute a part of this specification. The drawings together with the description illustrate embodiments of the present invention and serve to explain the principles of the present invention.

Figure 1:
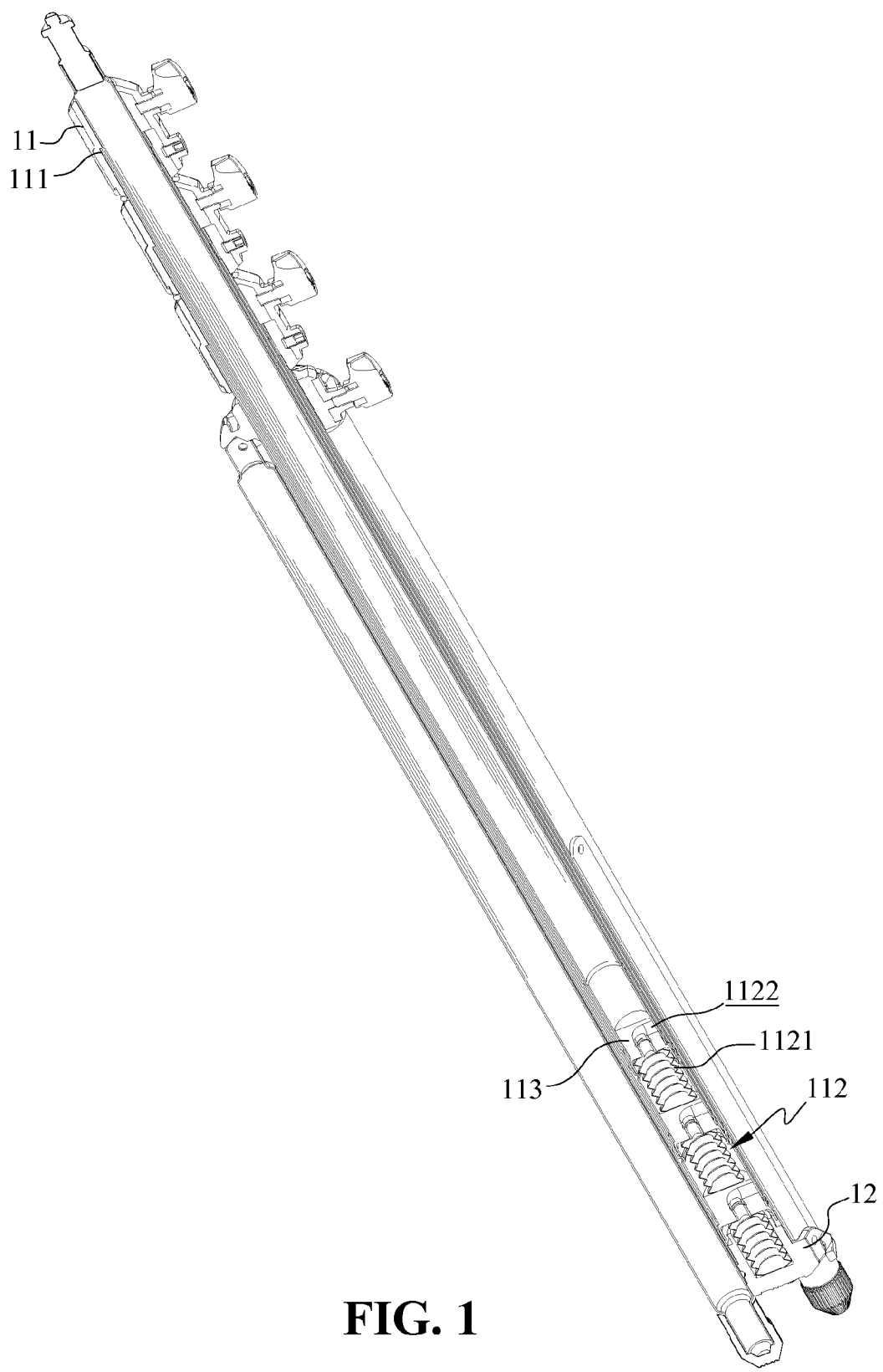
FIG. 1 is a perspective partial cross sectional view of a retractable post with an alarm device according to the present invention.
Figure 2:
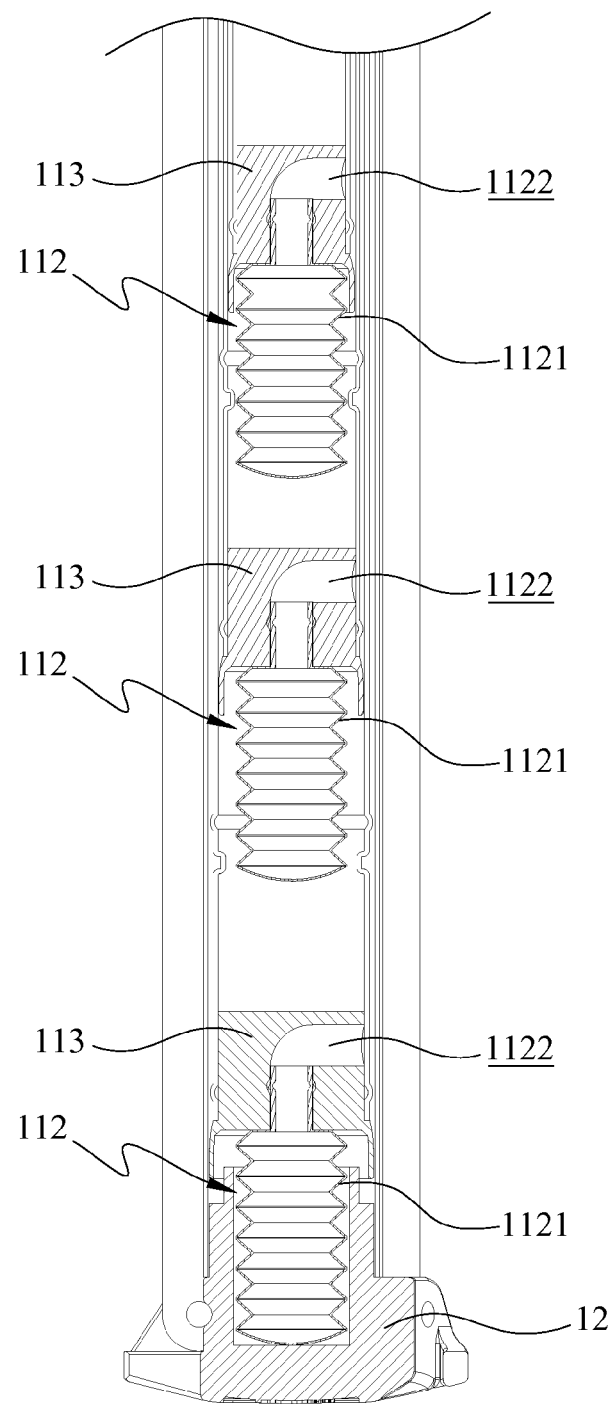
FIG. 2 is a cross sectional view showing an alarm device disposed in a retractable post according to a first embodiment of the present invention.
Figure 3:
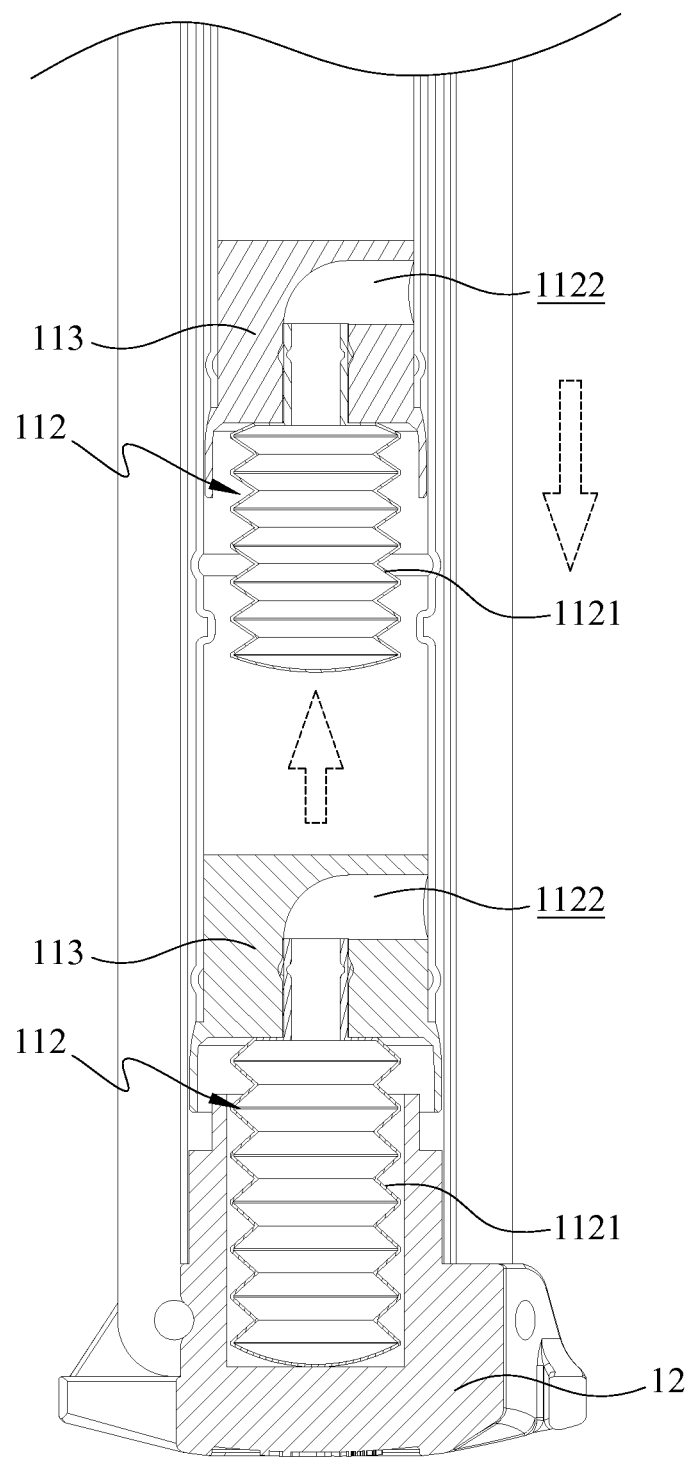
FIG. 3 is a cross sectional view showing an operation of the present invention.

Referring to FIGS. 1-3, a retractable post with an alarm device according to a first embodiment of the present invention comprises a plurality of retractable pipes 11 with different diameters retractably sleeved with each other, thereby achieving the purpose of volume reduction by retracting the retractable pipes 11. The quantity of the retractable pipes depends on users' requirement in length. A securing unit 111 is disposed on an exterior of each retractable pipe 11 for tightening and securing two adjacent retractable pipes 11, thereby adjusting the retractable pipes 11 to a required length and position. A retractable air whistle 112 is secured by a latch block 113 at a proper location inside the retractable pipe 11. A plug piece 12 is installed at a bottom of the retractable post. The plug piece 12 and the latch block 113 make an interior of each retractable pipe 11 present a dummy seal state, which means the retractable pipe is almost but not completely sealed. So, the air inside the retractable pipe cannot be massively discharged within a very short period of time, but can only be allowed to slowly leak out from gaps between pipe walls and gaps between components. When an abnormal rapid falling displacement of the retractable pipes 11 occurs, the latch block 113 and the retractable air whistle 112 compress the air inside the retractable pipe 11, and then a bellow 1121 of the retractable air whistle 112 is further compressed, such that the air inside the bellow 1121 is rapidly discharged through a sounding valve 1122 disposed at a front end of the air whistle 112, thereby generating a sound and achieving an alarm effect.

Figure 4:
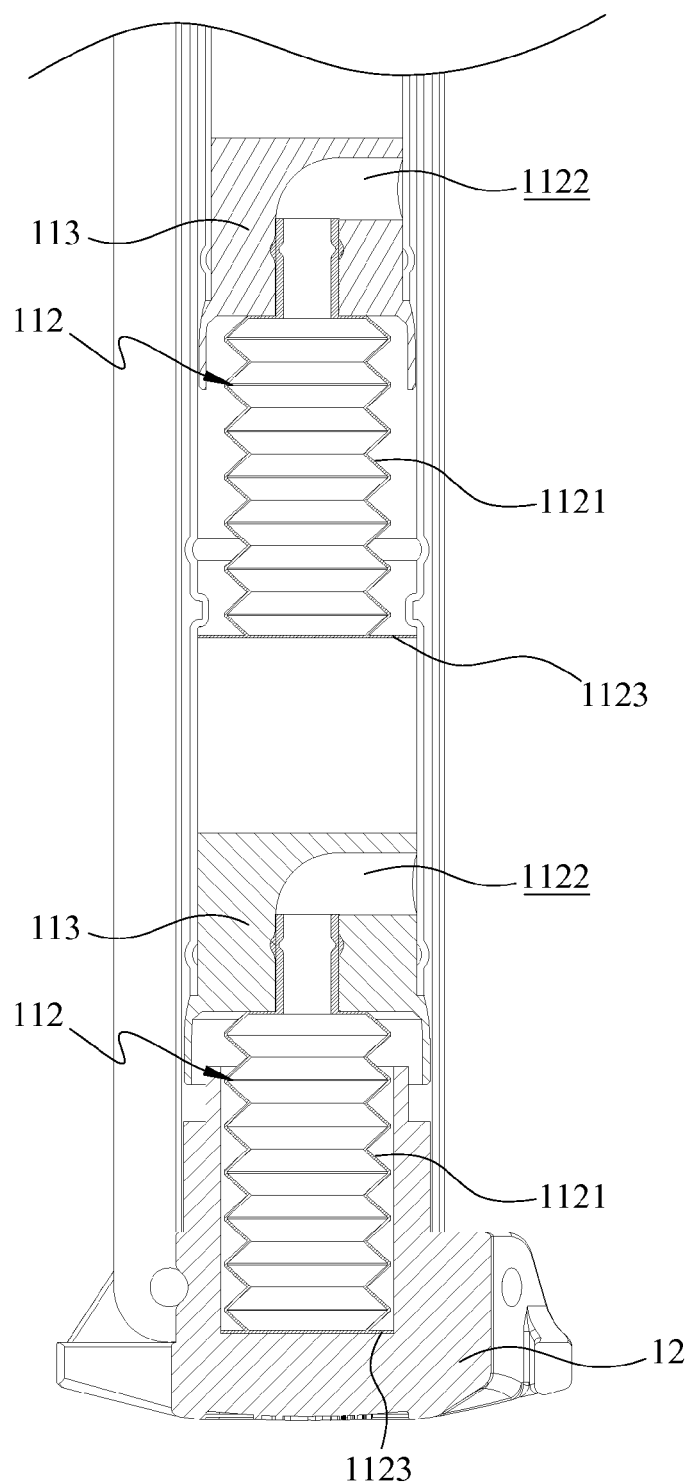
FIG. 4 is a cross sectional view showing an alarm device disposed in a retractable post according to a second embodiment of the present invention.

FIG. 4 is a cross sectional view showing an alarm device disposed in a retractable post according to a second embodiment of the present invention. All of the components of an alarm device in this embodiment are the same, assembled and operated as previously described in the first embodiment (see FIGS. 1-3) except that the retractable air whistle 112 of this embodiment further comprises an extension skirt 1123 disposed at a bottom of the bellow 1121, so as to increase the compression performance to the bellow 1121 and thus enhance the sound generating effect.

Figure 5:
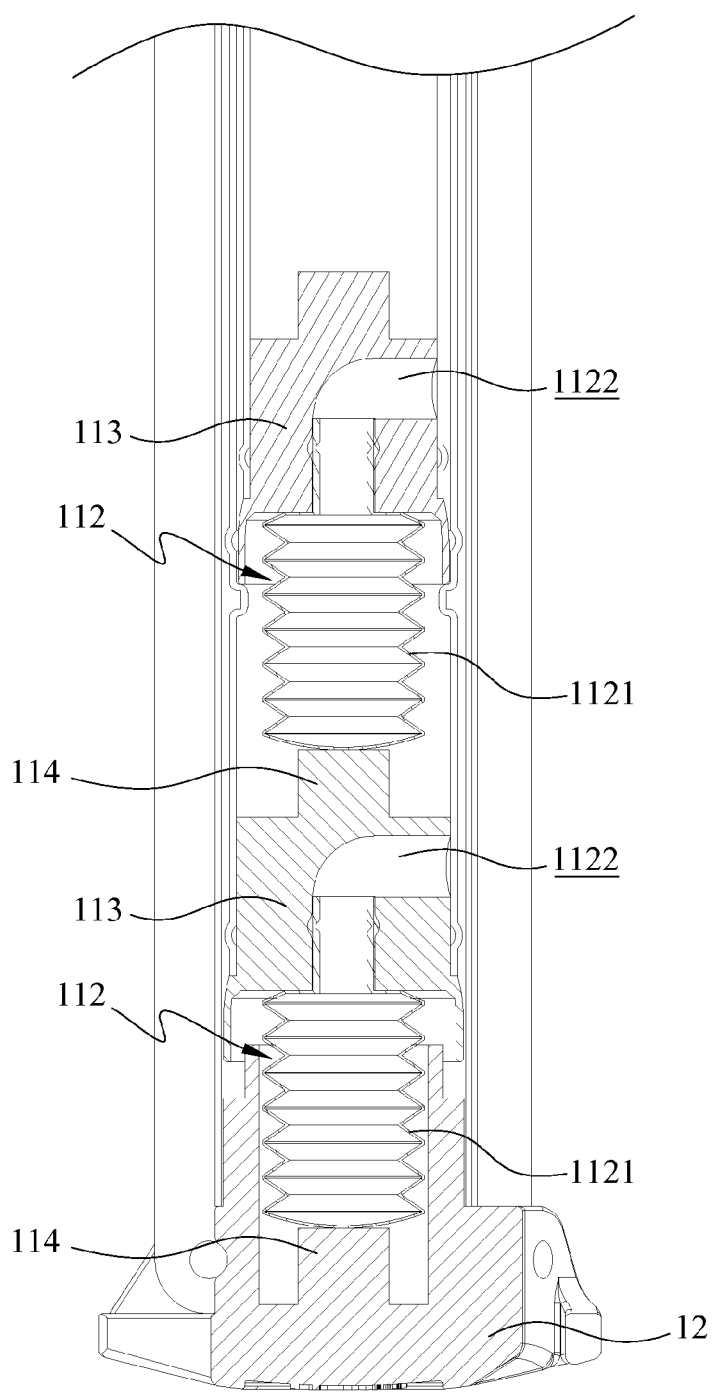
FIG. 5 is a cross sectional view showing an alarm device disposed in a retractable post according to a third embodiment of the present invention.

FIG. 5 is a cross sectional view showing an alarm device disposed in a retractable post according to a third embodiment of the present invention. All of the components of an alarm device in this embodiment are the same, assembled and operated as previously described in the first embodiment (see FIGS. 1-3) except that the plug piece 12 and the latch block 113 of this embodiment further comprise a protrusion block 114 disposed at a top of the plug piece 12 and the latch block 113 respectively, so as to further press against the bellow 112 and thus enhance the sound generating effect.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A retractable post with an alarm device, which is adapted for generating an alarm sound when the retractable post is abnormally fallen and retracted, the retractable post comprising a plurality of retractable pipes retractably sleeved with each other, wherein
   a retractable air whistle is secured by a latch block at a proper location inside the retractable pipe;
   a plug piece is installed at a bottom of the retractable post, the plug piece and the latch block make an interior of the retractable pipe present a dummy seal state, wherein the retractable pipe is almost but not completely sealed, the air inside the retractable pipe is able to only be allowed to slowly leak out from gaps between pipe walls,
   when an abnormal rapid falling displacement of the retractable pipes occurs, the latch block and the retractable air whistle compress the air inside the retractable pipe, and then a bellow of the retractable air whistle is further compressed, such that the air inside the bellow is rapidly discharged through a sounding valve disposed at a front end of the air whistle, thereby generating a sound and achieving an alarm effect.

2. The retractable post with the alarm device according to claim 1, wherein an extension skirt is disposed at a bottom of the bellow.

3. The retractable post with the alarm device according to claim 1, wherein a protrusion block is disposed at a top of the plug piece and the latch block, respectively.

4. The retractable post with the alarm device according to claim 1, wherein a securing unit is disposed on an exterior of the retractable pipe for tightening and securing two adjacent retractable pipes.

* * * * *